US011421709B2

(12) United States Patent
Schugardt et al.

(10) Patent No.: US 11,421,709 B2
(45) Date of Patent: Aug. 23, 2022

(54) SYSTEMS FOR INTERSTAGE PARTICLE SEPARATION IN MULTISTAGE RADIAL COMPRESSORS OF TURBINE ENGINES

(71) Applicant: HONEYWELL INTERNATIONAL INC., Morris Plains, NJ (US)

(72) Inventors: John Schugardt, Chandler, AZ (US); Katherine Smith, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 77 days.

(21) Appl. No.: 17/014,701

(22) Filed: Sep. 8, 2020

(65) Prior Publication Data

US 2022/0074426 A1 Mar. 10, 2022

(51) Int. Cl.
*F04D 29/44* (2006.01)
*F02C 3/08* (2006.01)
*F02C 6/08* (2006.01)

(52) U.S. Cl.
CPC .............. *F04D 29/444* (2013.01); *F02C 3/08* (2013.01); *F02C 6/08* (2013.01); *F05D 2240/12* (2013.01);
(Continued)

(58) Field of Classification Search
CPC .. F02C 7/05; F02C 7/052; F02C 7/055; F02C 3/08; F02C 6/08; F05D 2260/607;
(Continued)

(56) References Cited

U.S. PATENT DOCUMENTS 5,857,833 A * 1/1999 Dev ........................ F02C 3/05
415/121.2
8,845,281 B2 * 9/2014 Cerretelli .............. F04D 29/706
415/169.2
(Continued)

FOREIGN PATENT DOCUMENTS

EP 3599344 A1 1/2020
FR 2589957 A1 5/1987
(Continued)

*Primary Examiner* — Craig Kim
(74) *Attorney, Agent, or Firm* — Lorenz & Kopf, LLP

(57) ABSTRACT

Turbine engine systems for interstage particle separation in multistage radial compressors are disclosed. The multistage radial compressor system includes an interstage region positioned between a first stage radial compressor and a second stage radial compressor. The interstage region includes a radially-outward oriented section, a longitudinally-oriented section, and a radially-inward oriented section. The radially-outward oriented section transitions to the longitudinally-oriented section at a first approximately 90-degree bend, and the longitudinally-oriented section transitions to the radially-inward oriented section at a second approximately 90-degree bend. The multistage radial compressor system further includes a particle separation system including an extraction slot and an aspiration slot located downstream from the extraction slot. The particle separation system is positioned along the interstage region outside of the air flow path. The extraction slot fluidly connects with a scavenge plenum, and the aspiration slot allows air from the scavenge plenum to recirculate back into the air flow path.

14 Claims, 10 Drawing Sheets

(52) U.S. Cl.
CPC ...... *F05D 2240/35* (2013.01); *F05D 2250/52* (2013.01)

(58) Field of Classification Search
CPC ............. F05D 2250/52; F05D 2240/12; F05D 2240/35; B64D 2033/022; B64D 2033/0246; F04D 29/444
See application file for complete search history.

(56) References Cited

U.S. PATENT DOCUMENTS

| | | |
|---|---|---|
| 8,967,954 B2 | 3/2015 | Jonen et al. |
| 9,976,564 B2 | 5/2018 | Bueche et al. |
| 10,816,014 B2* | 10/2020 | Nasir .................... F04D 29/701 |
| 2010/0104422 A1* | 4/2010 | Martel ................... F02C 7/052 |
| | | 415/121.2 |
| 2014/0119891 A1* | 5/2014 | Schmittenberg .......... F02C 7/05 |
| | | 415/121.2 |
| 2016/0186601 A1* | 6/2016 | Manning ............... F01D 25/005 |
| | | 415/121.2 |
| 2018/0119569 A1 | 5/2018 | Masuda et al. |
| 2018/0135516 A1* | 5/2018 | Nasir .................... F04D 29/701 |
| 2018/0372121 A1* | 12/2018 | Higuchi .............. F04D 29/4206 |
| 2020/0032818 A1* | 1/2020 | Nasir ..................... B01D 45/04 |

FOREIGN PATENT DOCUMENTS

| | | | |
|---|---|---|---|
| FR | 2574871 B1 | | 4/1989 |
| GB | 597261 A | | 1/1948 |
| JP | 2002242699 A | * | 8/2002 |
| WO | 2010/061512 A1 | | 6/2010 |

* cited by examiner

SYSTEMS FOR INTERSTAGE PARTICLE SEPARATION IN MULTISTAGE RADIAL COMPRESSORS OF TURBINE ENGINES

TECHNICAL FIELD

The present disclosure generally relates to turbine engine technologies. More particularly, the present disclosure relates to systems for interstage particle separation in multistage radial compressors used in turbine engines.

BACKGROUND

Turbine engines are used for a number of purposes, including propulsion and/or driving various other components with electrical, pneumatic, and/or hydraulic power, and may include both propulsion engines (for air, land, and sea vehicles, for example) and auxiliary power units (APUs). Generally, a gas turbine engine includes a compressor section, a combustion section, and a turbine section. In many configurations, the compressor section is provided in multiple stages, such as two, three, or more stages. During operation, the compressor section draws in ambient air, compresses the air with its multiple compressor stages, and supplies the compressed air to the combustion section. In addition to the compressed air, the combustion section receives fuel via a fuel injection assembly, mixes the fuel with the compressed air, ignites the air/fuel mixture, and supplies the high energy combustion gases to the turbine section to drive one or more turbines, including a shaft that may be used to drive the compressor stages and otherwise generate power.

During operation, the ambient air drawn into the engine may contain undesirable particles, such as sand and dust, which may cause performance degradation, wear, increased maintenance, and eventually premature removal of engines. This is especially true in hot and dry environments, such as desert climates, where such particles are more prevalent in the ambient air. In order to prevent or at least minimize the impacts of particle ingestion into the engine, many vehicles use an inlet particle separator system, disposed upstream of the engine compressor section, to remove at least a portion of the undesirable particles.

Conventional inlet particle separators, such as those just mentioned, operate at relatively high efficiencies for relatively large particles (e.g., >about 20 microns and <about 1000 microns in greatest cross-sectional length). However, for relatively small particles (e.g., <=about 20 microns in greatest cross-sectional length), the efficiencies can be relatively low, resulting in a significant amount of these relatively small particles being ingested into the engine. These relatively small particles may have deleterious effects on the turbine engine during operation. For example, these particles may plug secondary bleed flow lines and/or may melt and form glass on relatively hot engine components, such as the combustor or the turbine airfoils, which can significantly reduce performance and the operating life of the engine.

Accordingly, it would be desirable to provide an additional particle separation system for separating the relatively small particles, prior to such particles reaching the engine hot sections. Additionally, it would be desirable to provide such additional particle separation system that are capable of preventing the particles from reaching secondary bleed flow lines, which are typically located upstream of the combustor in the interstage region of the multistage compressor section. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure relates to turbine engine systems for interstage particle separation in multistage radial compressors. In an exemplary embodiment, a turbine engine includes a multistage radial compressor system that includes a first stage radial compressor including a first stage impeller that rotates about a longitudinal axis of the compressor system and a first stage diffuser positioned radially-outward, with respect to the longitudinal axis, from the first stage impeller and downstream therefrom with respect to an air flow path through the compressor system, and a second stage radial compressor including a second stage impeller that rotates about the longitudinal axis of the compressor system and positioned downstream from the first stage radial compressor with respect to the air flow path. The multistage radial compressor system further includes an interstage region positioned between the first stage radial compressor and the second stage radial compressor. The interstage region includes a first, radially-outward oriented section positioned immediately downstream from the first stage diffuser, a second, longitudinally-oriented section positioned immediately downstream from the first radially-outward oriented section, and a third, radially-inward oriented section positioned immediately downstream from the second longitudinally-oriented section. The first radially-outward oriented section transitions to the second longitudinally-oriented section at a first approximately 90-degree bend, and the second longitudinally-oriented section transitions to the third radially-inward oriented section at a second approximately 90-degree bend. Still further, the multistage radial compressor system includes a particle separation system including a extraction slot and a aspiration slot located downstream from the extraction slot. The particle separation system is positioned at one or more of: (1) an outer wall of the second approximately 90-degree bend; and/or (2) an outer wall of the third radially-inward oriented section immediately downstream from the second approximately 90-degree bend. The extraction slot fluidly connects with a scavenge plenum of the particle separation system positioned outside of the air flow path, and the aspiration slot allows air from the scavenge plenum to recirculate back into the air flow path.

This Brief Summary is provided to describe select concepts in a simplified form that are further described in the Detailed Description. This Brief Summary is not intended to identify key or essential features of the claimed subject matter, nor is it intended to be used as an aid in determining the scope of the claimed subject matter.

BRIEF DESCRIPTION OF THE DRAWING

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any particle separation embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. As further used herein, the word "about" or "approximately" means a possible variance (+/−) of the stated value of up to 10%, or alternatively up to 5%. Furthermore, there is no intention to be bound by any expressed or implied theory presented in the preceding technical field, background, brief summary, or the following detailed description.

Figure 1:
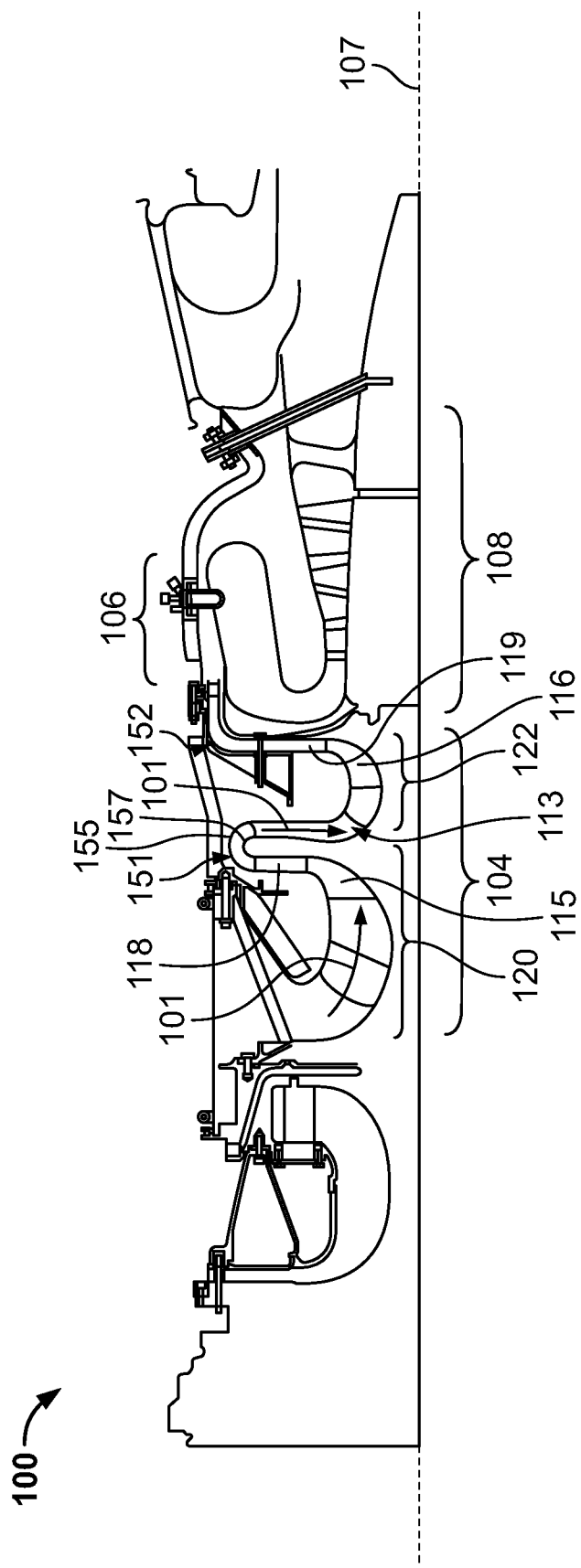
FIG. 1 is a simplified cross-section side view of an exemplary gas turbine engine including two compressor sections according to an embodiment of the present disclosure.

FIG. 1 illustrates portions of a gas turbine engine 100 including a multistage compressor section 104 including a first radial compressor stage 120 and a second radial compressor stage 122, a combustor section 106, and a turbine section 108. The compressor section 104 and the turbine section 108 rotate about longitudinal axis 107. As illustrated, each of the first and second radial compressor stages 120, 122 includes an impeller 115, 116 and a diffuser 118, 119 located downstream and radially outward from the respective impeller 115, 116. Subsequent to the diffuser 118 associated with the first radial compressor stage 120 is located a bending or arcuate crossover duct 151, wherein the air flow changes from radially-outward, to axially-rearward, to radially-inward, prior to entering cross-over duct vanes 113, which serves to remove some of the swirl in the air flow path, which is illustrated with arrows 101. Also shown, downstream of the first compressor is the second radial compressor 122, and its associated diffuser 119, subsequent to which is another arcuate section 152 leading to the combustor 106. Regarding the diffuser 118, 119, any suitable configuration may be employed. These include, for example, vaned, vane-island, channel, vaneless, or pipe, and may be constructed as castings or as 3-D printings, machined multi-piece constructions, or with the use of sheet metal vanes.

As such, FIG. 1 generally illustrates a two-stage radial compressor system 104, wherein the two-stage radial compressor system 104 includes a first stage radial compressor 120 including a first stage impeller 115 that rotates about a longitudinal axis 107 of the compressor system 104 and a first stage diffuser 118 positioned radially-outward, with respect to the longitudinal axis 107, from the first stage impeller 115 and downstream therefrom with respect to an air flow path 101 through the compressor system 104, and wherein the two-stage radial compressor system 104 includes a second stage radial compressor 122 a second stage impeller 116 that rotates about the longitudinal axis 107 of the compressor system 104 and positioned downstream from the first stage radial compressor 120 with respect to the air flow path 101.

Figure 2:
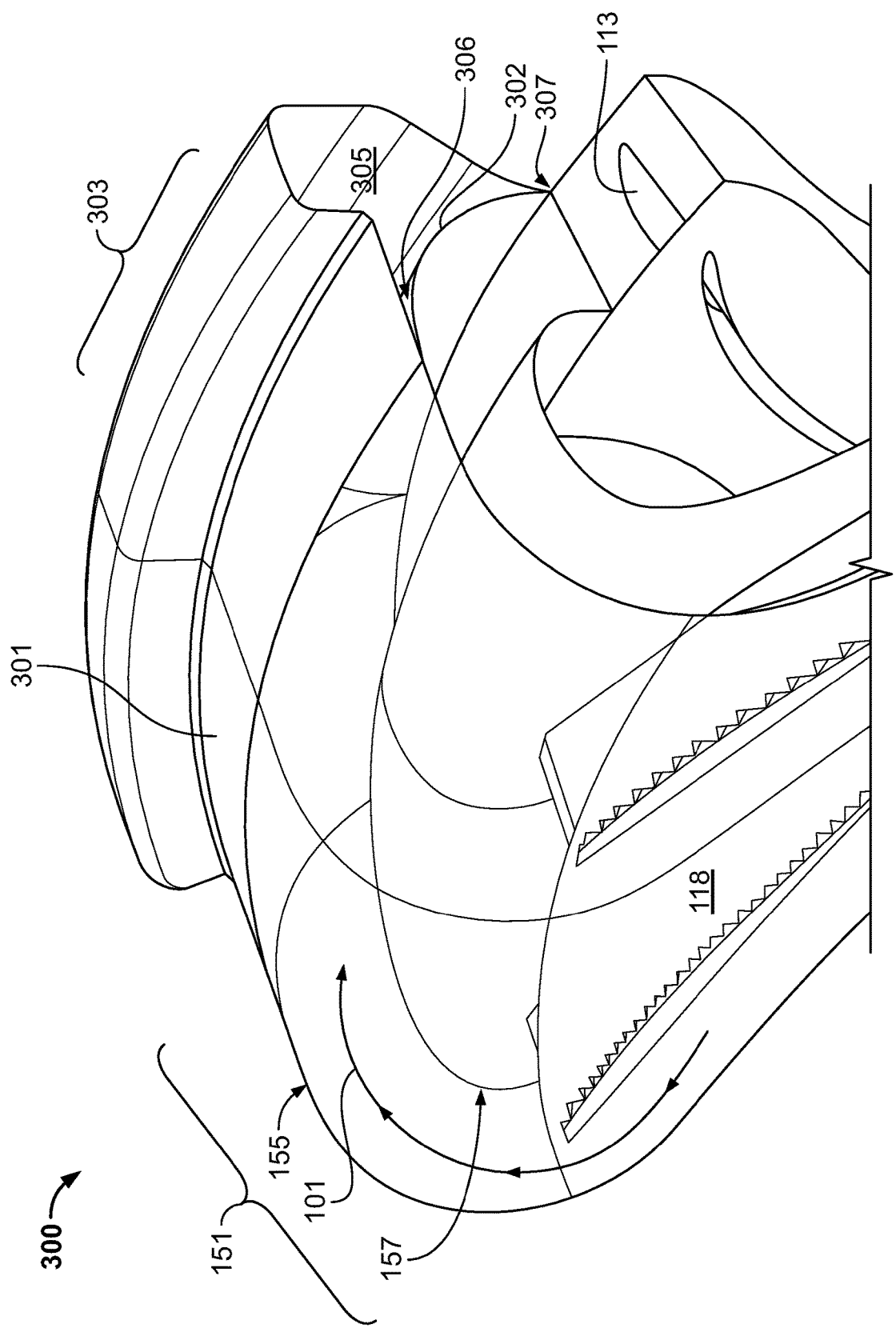
FIG. 2 is a perspective view of a small particle separation system used in some embodiments of the present disclosure.

Through the approximate 180-degree turn that the air flow path 101 experiences in the vicinity of the crossover duct 151, the relatively smaller particles will naturally migrate to the radially-outer annular (shroud) wall 155 of the air flow path 101 due to their own momentum (the radially-inner (hub) annular wall is illustrated with reference numeral 157). This migration presents multiple locations in the vicinity of crossover duct 151 to extract particles out of the main air flow path 101 and into adjacent plenums. In various configurations, particles may leave the main air flow path 101 through an extraction slot or slots, wherein they are sequestered in a plenum, and compressed air having the particles removed may return from the plenum to the main air flow path 101 through an aspiration slot or slots. FIG. 2 provides an illustration of an embodiment of an extraction slot/plenum/aspiration slot configuration that is suitable for use in the multistage compressor sections of the present disclosure. It should be noted that FIG. 2 is provided initially to illustrate particular details of the extraction slot/plenum/ aspiration slot configuration but is not intended to represent any particular area with respect to the crossover duct 151 wherein such configuration would be located. Rather, alternative embodiments for such locations are provided in detail, and described further below, in connection with FIGS. 3A, 3B, 4A, and 4B.

As such, FIG. 2 illustrates a fine particle separation system 300, the configuration including an extraction slot 306 in the outer annular 155 wall that leads to a scavenge plenum 305. The extraction slot 306 may be embodied as a continuous (circumferential) slot or opening fluidly connecting the air flow path 101 with the scavenge plenum 305. The extraction slot may be axi-symmetrical, and may encompass from about 1% to about 50%, for example about 1% to about 25%, such as about 1% to about 15%, of the area of the air flow path 101, that is, the space between the outer and inner annular walls 155, 157 nearest the outer annular wall 155. The extraction slot 306 may be located at various positions along the outer annular wall 155 with respect to the crossover duct 151, as will be described in greater detail below in connection with FIGS. 3A, 3B, 4A, and 4B. The extraction slot 306 should be sized such that bleed air through the extraction slot 306 amounts to less than 5%, such as less than 1% of total air flow, preferably as close to 0% as possible. The scavenge plenum 305 is located on the opposite side of the outer annular wall 155 with respect to the air flow path 101. The scavenge plenum 305 includes an inner radial wall 302, an outer radial wall 301, and an axial end wall 303 positioned at an opposite axial (downstream) end of the plenum 305 with respect to the extraction slot 306. The inner radial wall 302 of the scavenge plenum 305 may conform to and be adjacent with the outer annular wall 155. The scavenge plenum 305 further includes one or more openings in the inner radial wall 302 configured as one or more aspiration slots 307 fluidly connecting between the scavenge plenum 305 and the air flow path 101 (also via one or more openings in the outer annular wall 155) that may, like the extraction slot, be circumferential and axi-symmetric, wherein compressed air may return from the plenum 305 to the air flow path 101. In general, there is no restriction on the location or quantity of aspiration slots 307, whether equal to the number of downstream crossover duct vanes (113) or a multiple thereof. Moreover, the aspiration slots 307 may be positioned upstream, in line with, or downstream of the crossover duct vane leading edges, in embodiments.

FIGS. 3A, 3B, 4A, and 4B illustrate various embodiments of the present disclosure, wherein the illustrations are enlarged views of the interstage region of compressor section 104 including the crossover duct 151. Common to all of these figures, generally shown is the interstage region including cross-over duct 151 positioned between the first stage radial compressor 120 and the second stage radial compressor 122 (compressors not illustrated), wherein the interstage region flow path includes a first, radially-outward oriented section 181 positioned immediately downstream from the first stage diffuser 118, a second, longitudinally-oriented section 182 positioned immediately downstream from the first radially-outward oriented section 181, and a third, radially-inward oriented section 183 positioned immediately downstream from the second longitudinally-oriented section 182. In some embodiments, the sections 181 and 183 may be effectively adjacent to one another, such that section 182 has a longitudinal length of zero. The first radially-outward oriented section 181 transitions to the second longitudinally-oriented section 182 at a first approximately 90-degree bend 191, and the second longitudinally-oriented section 182 transitions to the third radially-inward oriented section 183 at a second approximately 90-degree bend 192. Also illustrated are the crossover duct vanes 113 before the second stage compressor 122.

As further shown in FIGS. 3A, 3B, 4A, and 4B, the particle separation system 300 includes the extraction slot 306 and the aspiration slot 307 located downstream from the extraction slot 306. The particle separation system is positioned at one or more of various locations that experience a marked change in direction of air flow from axial to radial or vice versa. For example, in FIGS. 3A and 3B, the particle separation system 300 may be located at the outer annular wall 155 at the second approximately 90-degree bend 192. In this embodiment, the extraction slot 306 may be located generally at or immediately upstream from the upstream end of the second approximately 90-degree bend 192, shown by position 503, and the aspiration slot 307 may be located generally at or immediately upstream from the downstream end of the second approximately 90-degree bend 192, shown by position 504.

Figure 4A:
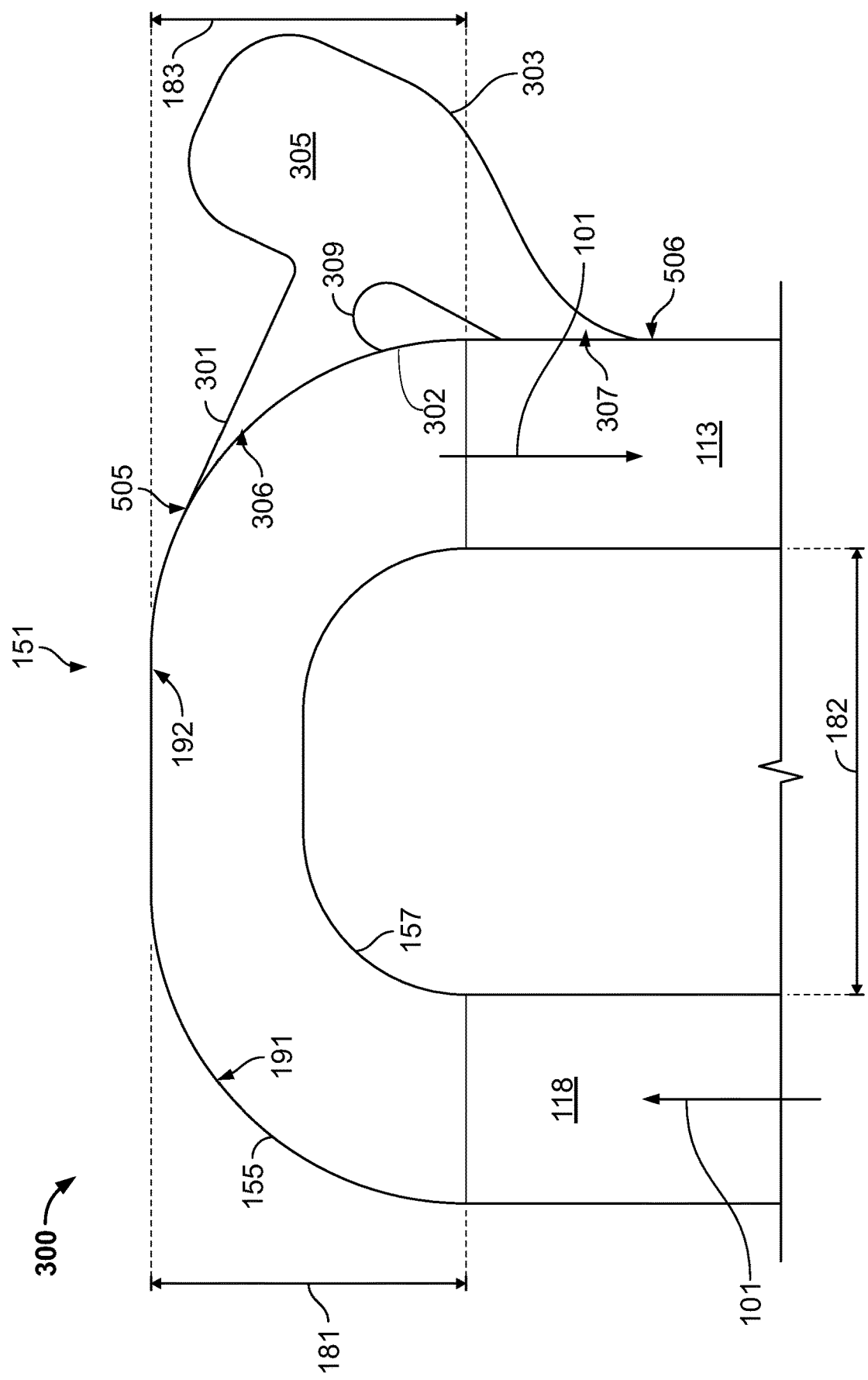
FIGS. 4A and 4B are cross-section views of an interstage portion of a compressor section utilizing a second small particle separation system in alternative embodiments.
Figure 4B:
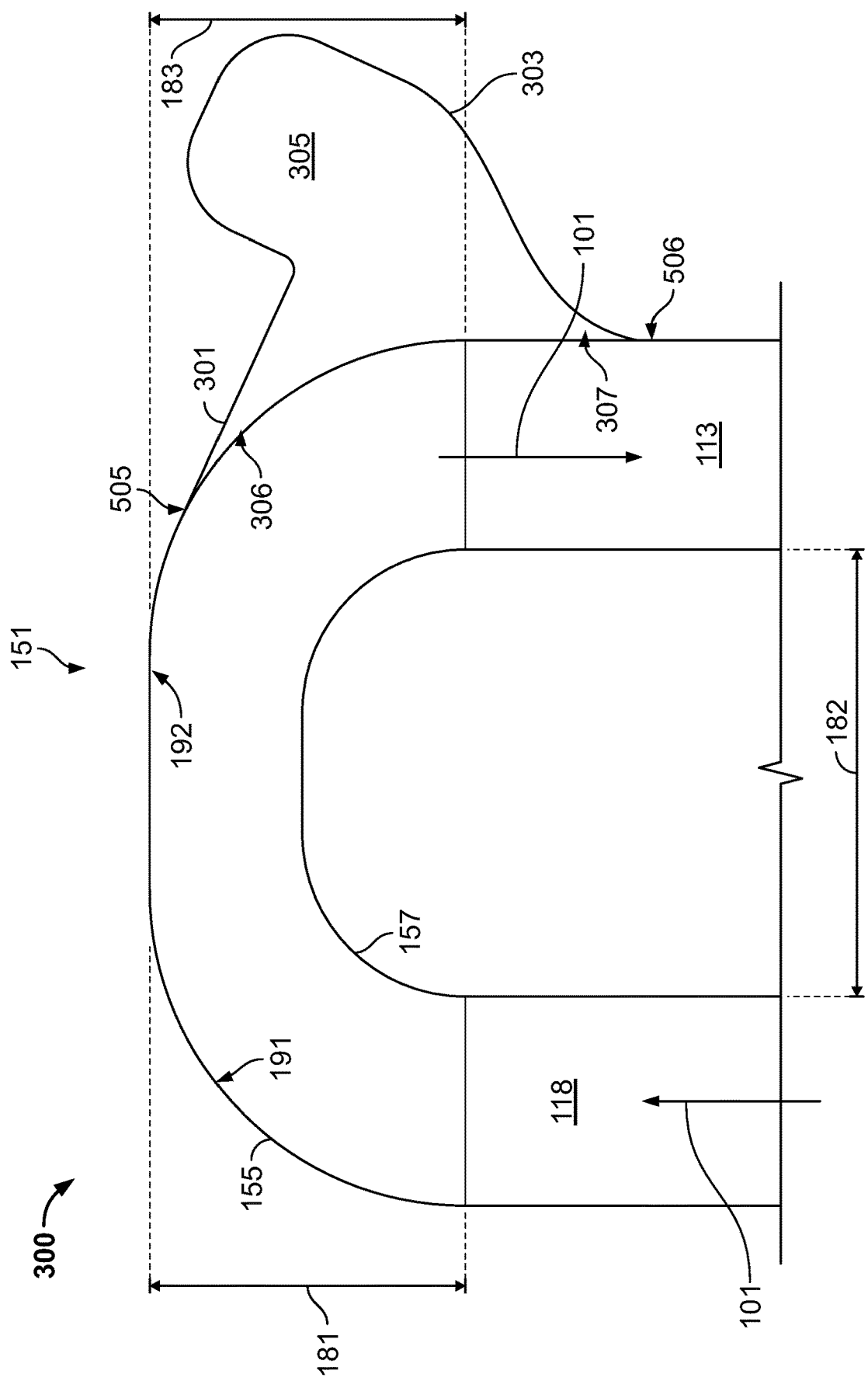

In another example, in FIGS. 4A and 4B, the particle separation system 300 may be located at the outer annular wall 155 at the third radially-inward oriented section immediately downstream from the second approximately 90-degree bend 192. In this embodiment, the extraction slot 306 may be located generally along the second approximately 90-degree bend 192, shown by position 505, and the aspiration slot 307 may be located generally at or immediately downstream of the downstream end of the approximately 90-degree bend, shown by position 506.

In either of the foregoing embodiments, the extraction slot 306 fluidly connects with the scavenge plenum 305 of the particle separation system 300, which is positioned outside of the air flow path 101. Further, the aspiration slot 307 allows air from the scavenge plenum 305 to recirculate back into the air flow path 101. In some embodiments, multiple particle separation systems may be provided, and they may be located at two or more of the above-described locations in the interstage region. Still further, with specific reference to FIGS. 3A and 4A, a center-body 309 may be disposed along the inner radial wall 302 between the extraction slot 306 and the aspiration slot 307, within the plenum 305. This center-body 309 generally functions to physically separate air flow along the inner radial wall 302 between the extraction slot 306 and the aspiration slot 307, such that the extraction slot 306 and the aspiration slot 307 are discrete openings. In contrast, in FIGS. 3B and 4B, no center-body is present, and the extraction slot 306 and the aspiration slot 307 generally merge into a single opening where air flows in and out, but the small particles are captured within the plenum 305. As such, as shown in FIGS. 3A, 3B, 4A, and 4B, the inner radial wall 302 between the extraction slot 306 and the aspiration slot 307 only exists when there is a center-body 309 present (i.e., FIGS. 3A and 4A).

Figure 3A:
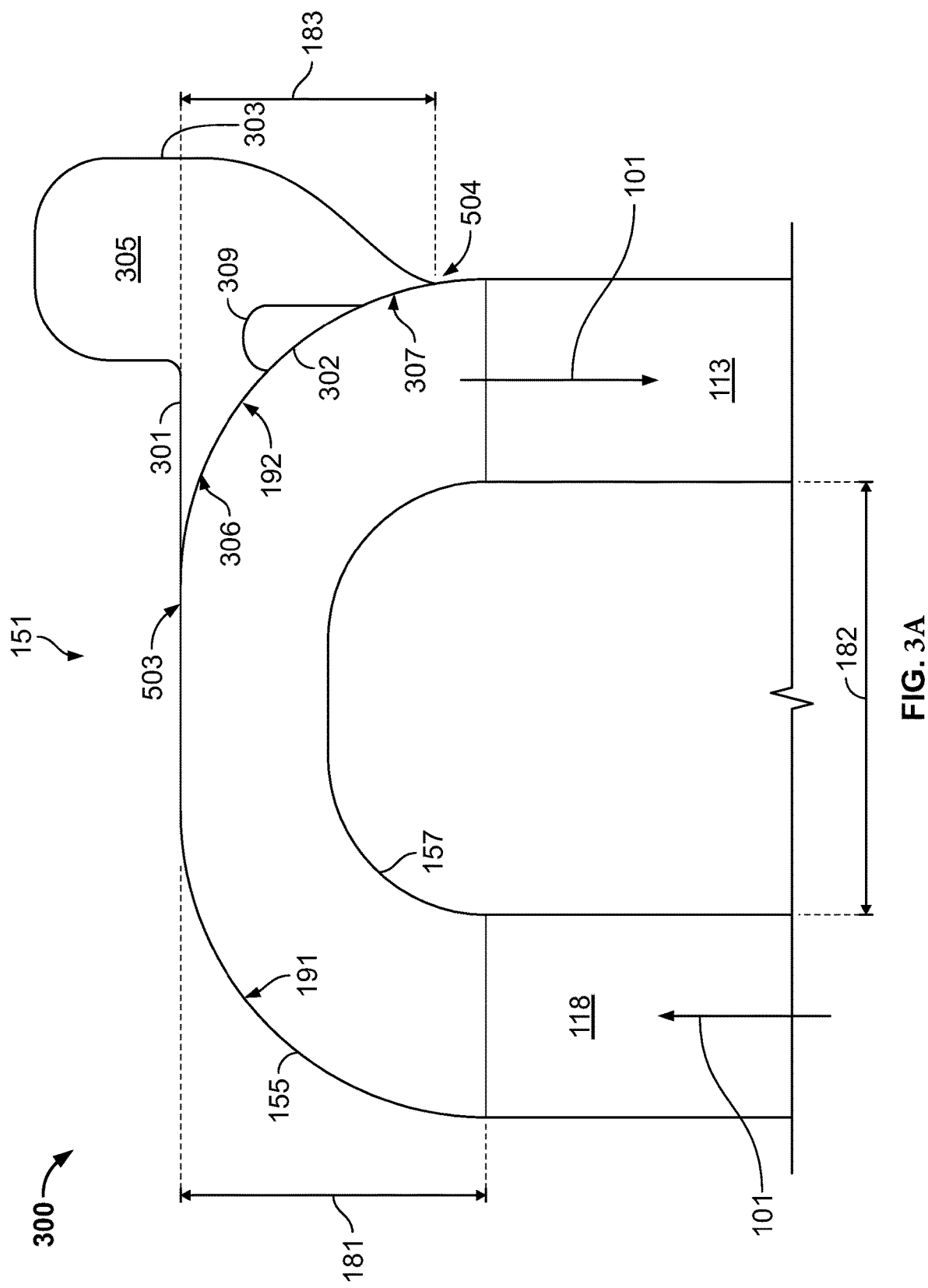
FIGS. 3A and 3B are cross-section views of an interstage portion of a compressor section utilizing a first small particle separation system in alternative embodiments.
Figure 3B:
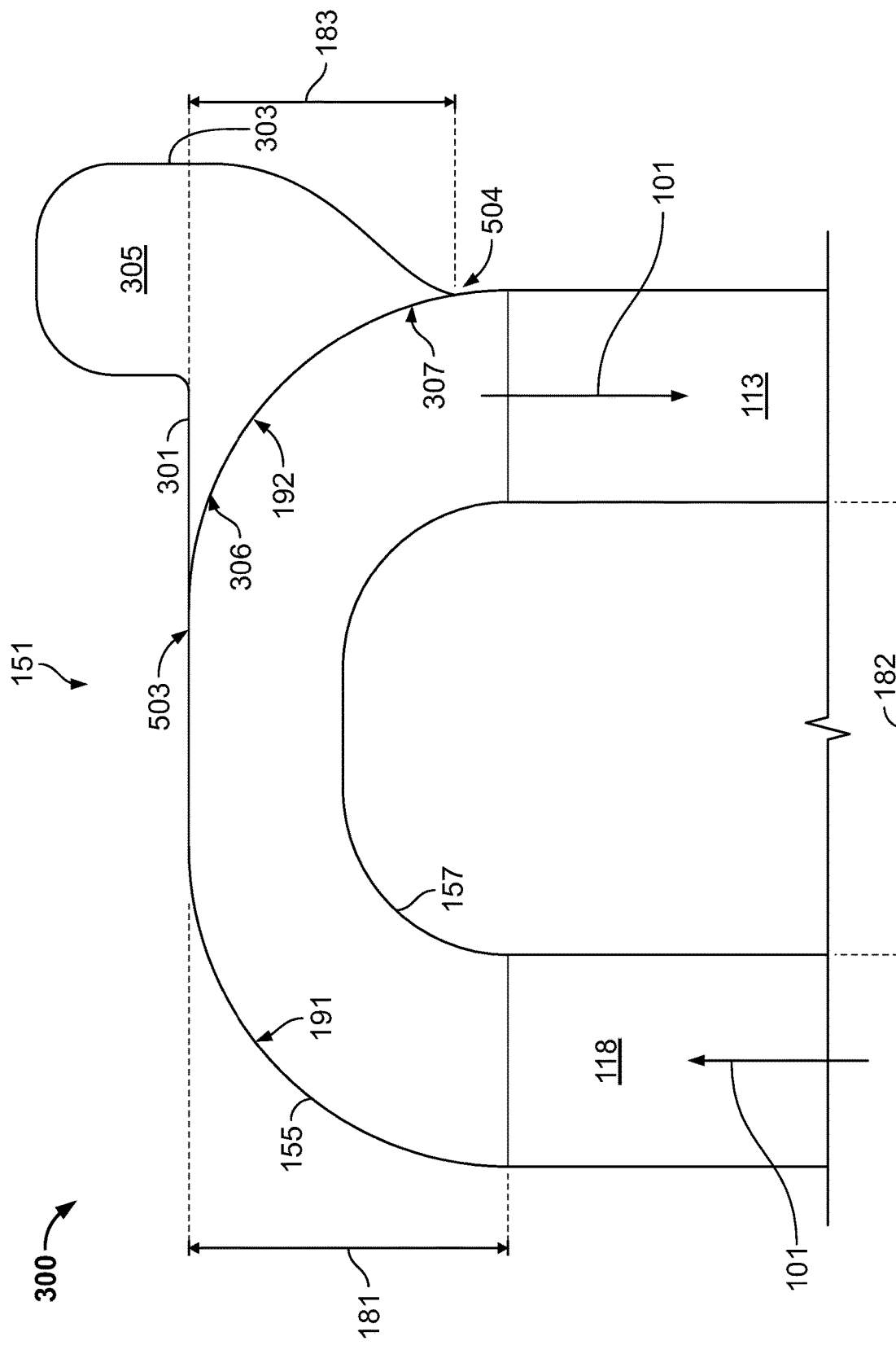
Figure 5A:
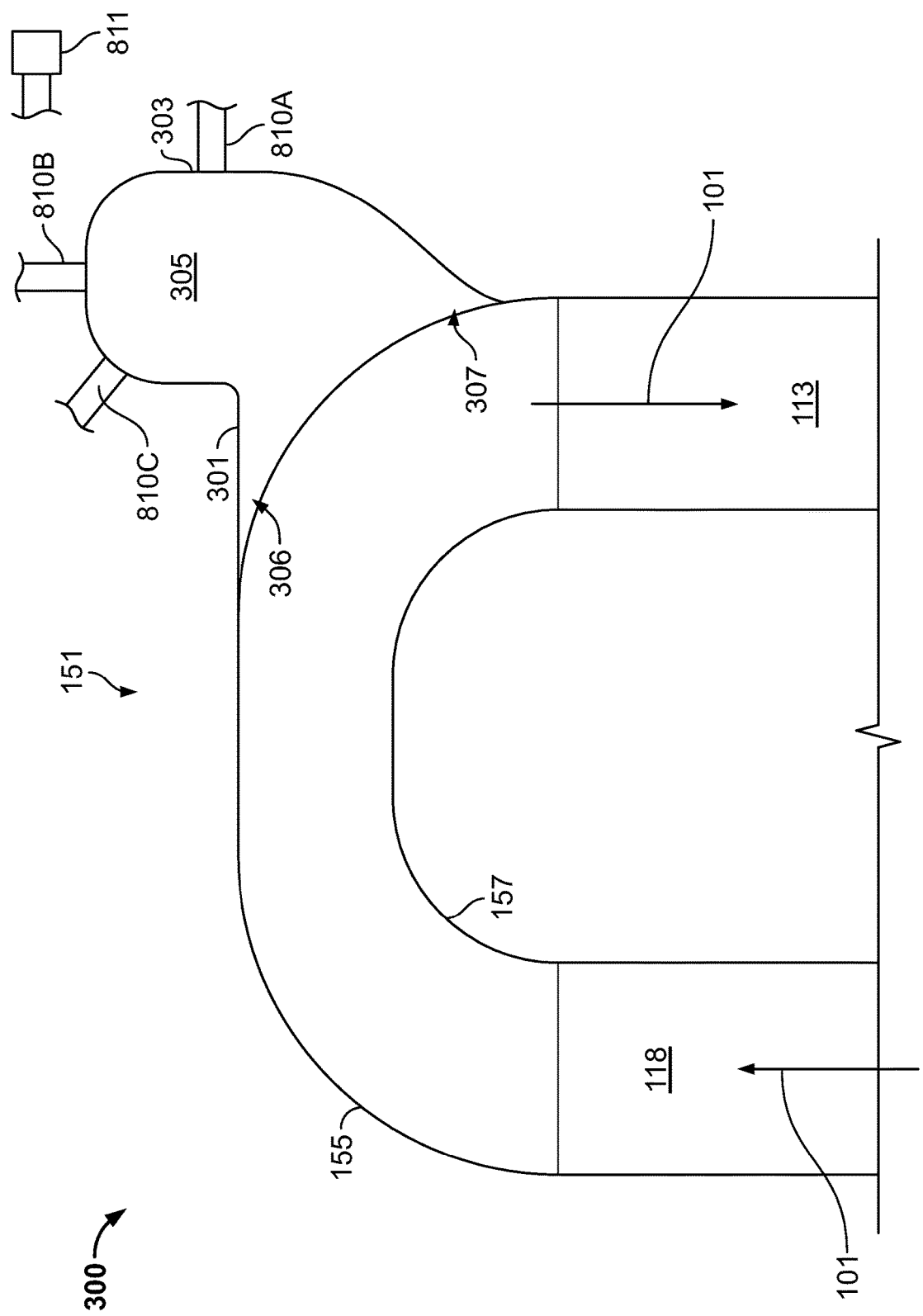
FIGS. 5A-5D are cross-section views of alternative embodiments of small particle scavenging configurations in accordance with the present disclosure.
Figure 5B:
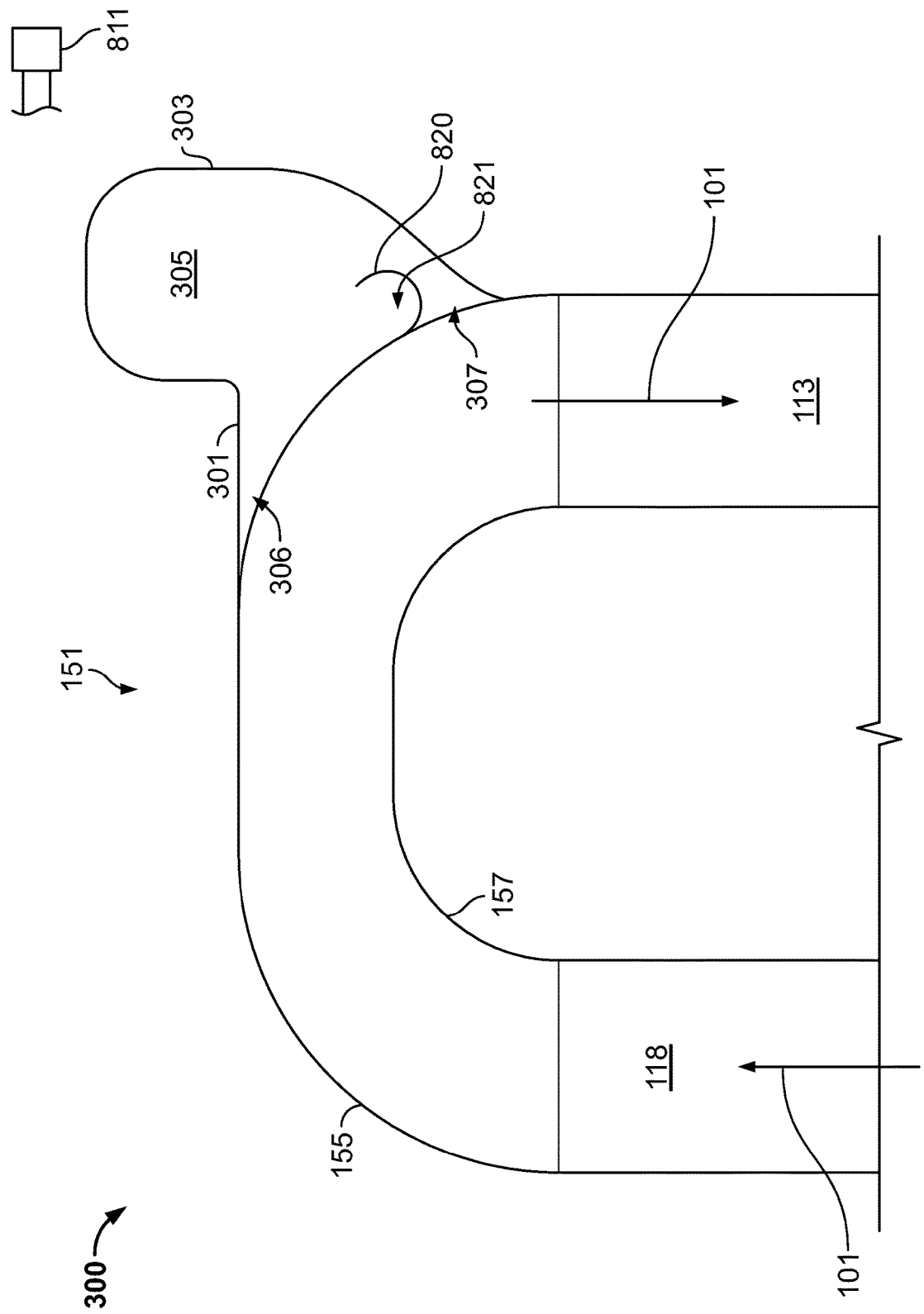
Figure 5C:
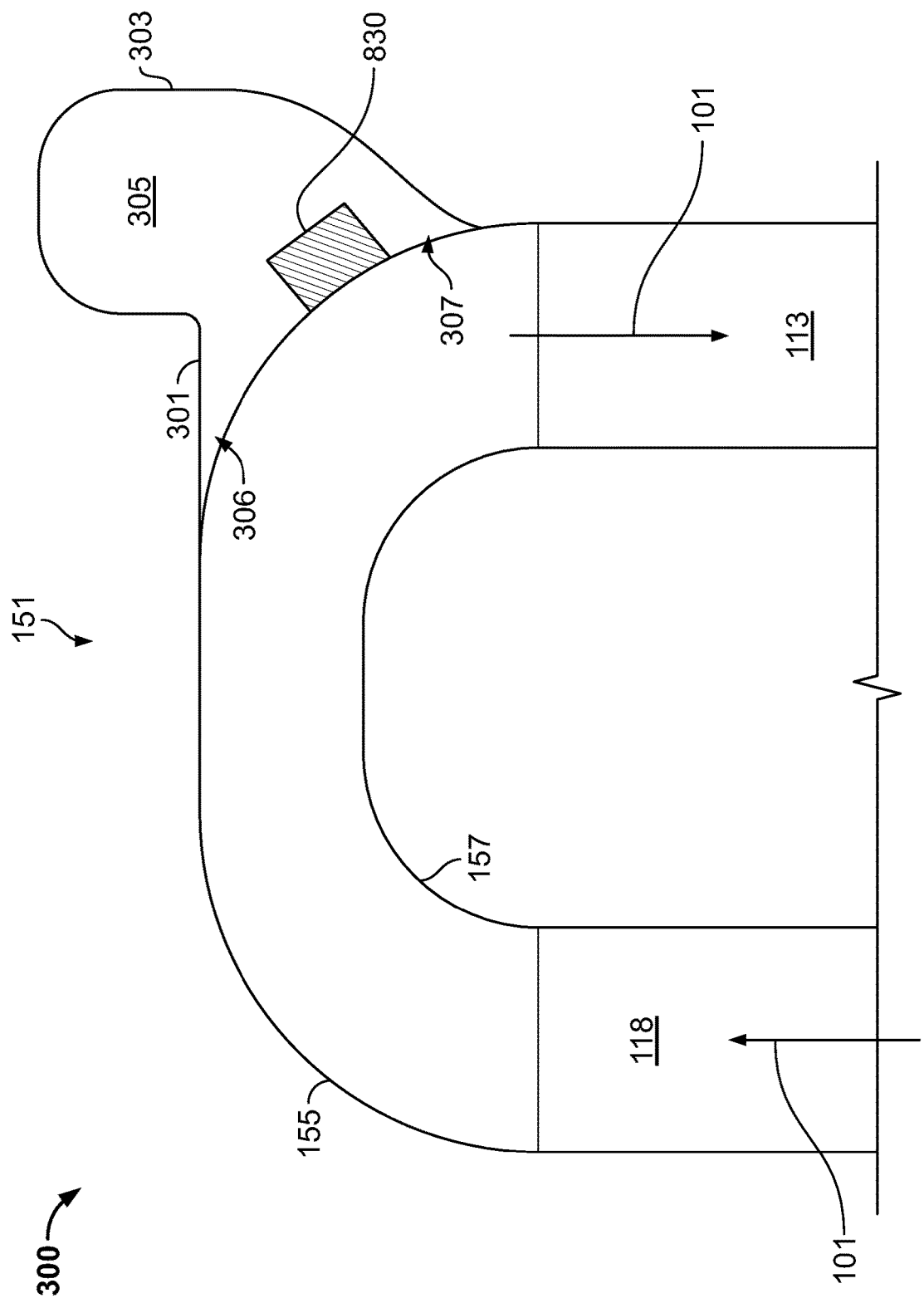
Figure 5D:
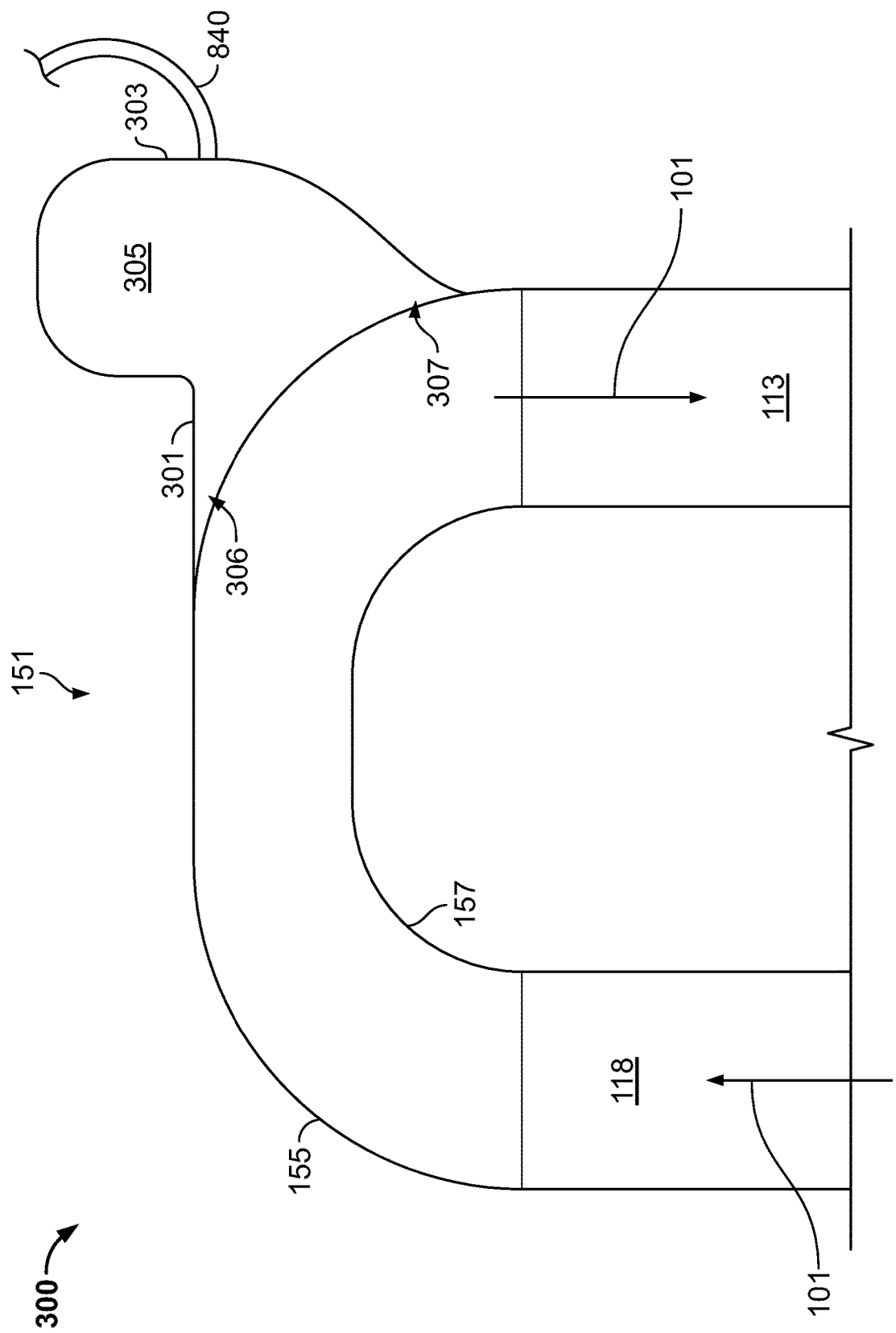

Optionally, some embodiments of the present disclosure may employ a small particle scavenging configuration, which is suitable to withdraw the trapped small particles from the plenum 305. Various embodiments of small particle scavenging configurations are shown in FIGS. 5A-5D. While the fine particle separation system 300 having its plenum positioned and configured as in FIG. 3A is shown in FIGS. 5A-5D, it should be appreciated that the scavenging configurations of any of FIG. 3B, 4A, or 4B would be equally appropriate for use with the first fine particle separation system 300 as well. As shown in FIG. 5A, in one embodiment, withdrawal of the small particles and air from the scavenge plenum 305 may be accomplished by one or more ports 810A-C positioned in an axial (810A), radial (810B), or circumferential (810C) angle (or compound angle, i.e., some combination of two or more of axial, radial, and circumferential) orientation, with a downstream "smart" particle removal system 811 (such as an electronically controlled smart purge valve) to regulate timing and quantity of air flow. The smart purge valve 811 may be configured, for example, to operate intermittently during engine operation, and/or upon engine shutdown. In another embodiment, as shown in FIG. 5B, withdrawal of the small particles and air from the scavenge plenum 305 may be accomplished using a scroll with a tangential outlet. That is, the scavenge plenum 305 may be designed and configured as scroll 820 with tangential outlet 821. The outlet(s) 821 of scavenge plenum 305 may be connected to the engine exhaust via smart particle removal mechanisms such as electronically controlled purge valve 811, as set forth above. In another embodiment, as shown in FIG. 5C, in place of or in addition to a smart valve or outlet (811), the scavenge plenum 305 may employ one or more small particle filters 830 that are sized and positioned to collect small particles within the scavenge plenum 305 as the air flows there-through. These filters 830 may be removed for cleaning purposes when the engine is not operating, for example after the engine is shut down. Accordingly, the small particles are removed from the plenum 305 as a consequence of the filter 830 removal and cleaning, and a purge valve/outlet may not be required. In yet another embodiment, as shown in FIG. 5D, one or more bypass circuits 840 may be added to the scavenge plenum 305 to extract small particle laden flow from the scavenge plenum 305 to trap the particles in a filter, for example, and to return relatively cleaner (i.e., less small particle laden) air back to the scavenge plenum 305. This bypass circuit 840 arrangement may eliminate the use of a purge valve or outlet and may allow the particles to be accumulated in a filter which, as with the preceding embodiment, may be changed when the engine is not operating. Accordingly, the small particles are removed from the plenum 305 as a consequence of the filter removal and cleaning. In the illustrated embodiment, the bypass circuit 840 is shown in the axial wall end 303. In other embodiments, the bypass circuit 840 may be located in the outer radial wall 301.

Accordingly, the present disclosure has provided various embodiments of small particle separation system with various scavenge methodologies for use in gas turbine engines with multistage compressor sections, such as propulsiontype engines and APUs. The disclosed configurations exhibit improved particle separation efficiency, particularly with regard to small sand particles. As noted above, these configurations may be implemented in addition to or as an alternative to conventional inlet particle separators and may be located at positions within the engine that are along various areas of the interstage region crossover duct, for example where there is a marked change in flow path from the radial direction to the axial direction or vice versa. Moreover, the particle separation system are located upstream of the bleed valves, which prevent the small particles from entering and potentially plugging those secondary flow lines.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine engine comprising a multistage radial compressor system, wherein the multistage radial compressor system comprises:

a first stage radial compressor comprising a first stage impeller that rotates about a longitudinal axis of the compressor system and a first stage diffuser positioned radially-outward, with respect to the longitudinal axis, from the first stage impeller and downstream therefrom with respect to an air flow path through the compressor system;

a second stage radial compressor comprising a second stage impeller that rotates about the longitudinal axis of the compressor system and positioned downstream from the first stage radial compressor with respect to the air flow path;

an interstage region positioned between the first stage radial compressor and the second stage radial compressor, wherein the interstage region comprises a first, radially-outward oriented section positioned immediately downstream from the first stage diffuser, a second, longitudinally-oriented section positioned immediately downstream from the first radially-outward oriented section, and a third, radially-inward oriented section positioned immediately downstream from the second longitudinally-oriented section, wherein the first radially-outward oriented section transitions to the second longitudinally-oriented section at a first approximately 90-degree bend, and the second longitudinally-oriented section transitions to the third radially-inward oriented section at a second approximately 90-degree bend; and a particle separation system comprising an extraction slot and an aspiration slot located downstream from the extraction slot, wherein (1) the extraction slot is located at or immediately upstream from an upstream end of the second approximately 90-degree bend and the aspiration slot is located at or immediately upstream from a downstream end of the second approximately 90-degree bend or (2) the extraction slot is located along the second approximately 90-degree bend and the aspiration slot is located at or immediately downstream of a downstream end of the second approximately 90-degree bend, wherein the extraction slot fluidly connects with a scavenge plenum of the particle separation system positioned outside of the air flow path, and wherein the aspiration slot allows air from the scavenge plenum to recirculate back into the air flow path.

2. The turbine engine of claim 1, wherein the extraction slot is located at or immediately upstream from the upstream end of the second approximately 90-degree bend and the aspiration slot is located at or immediately upstream from the downstream end of the second approximately 90-degree bend.

3. The turbine engine of claim 1, wherein the extraction slot is located along the second approximately 90-degree bend and the aspiration slot is located at or immediately downstream of the downstream end of the second approximately 90-degree bend.

4. The turbine engine of claim 1, wherein the extraction slot comprises a continuous circumferential slot and encompasses from about 1% to about 50% of an area of the air flow path.

5. The turbine engine of claim 4, comprising a plurality of aspiration slots, and where the plurality of aspiration slots are disposed upstream of, in line with, or downstream of one or more crossover duct vane leading edges.

6. The turbine engine of claim 1, further comprising a center-body disposed within the scavenge plenum and between the extraction slot and the aspiration slot that protrudes radially outward from the air flow path and physically separates air flow between the extraction slot and the aspiration slot.

7. The turbine engine of claim 1, wherein the extraction slot and the aspiration slot are merged as a single opening that allows air to flow into and out of the scavenge plenum.

8. The turbine engine of claim 1, wherein a configuration of the first stage diffuser is selected from the group consisting of: vaned, vane-island, channel, vaneless, or pipe.

9. The turbine engine of claim 1, wherein the turbine engine is embodied as a propulsion turbine engine or an auxiliary power unit (APU).

10. The turbine engine of claim 1, wherein the multistage radial compressor system is a two-stage radial compressor section.

11. The turbine engine of claim 1, further comprising a small particle scavenging configuration, wherein the small particle scavenging configuration comprises a withdrawal port of the scavenge plenum, wherein the withdrawal port is configured at an axial angle, a radial angle, a tangential angle, or a compound/combination angle thereof relative to the scavenge plenum.

12. The turbine engine of claim 1, further comprising a small particle scavenging configuration, wherein the small particle scavenging configuration comprises an outlet of the plenum, the outlet of the plenum being configured in a scroll configuration.

13. The turbine engine of claim 1, further comprising a small particle scavenging configuration, wherein the small particle scavenging configuration comprises a filter of the plenum configured for removing and cleaning while the turbine engine is not operating.

14. The turbine engine of claim 1, further comprising a small particle scavenging configuration, wherein the small particle scavenging configuration comprises a bypass circuit coupled with the plenum, the bypass circuit comprising a filter, the filter configured for removing and cleaning while the turbine engine is not operating.

\* \* \* \* \*